Sept. 16, 1941. C. A. IVERSON 2,256,432
SIPHONING DEVICE
Filed April 24, 1940
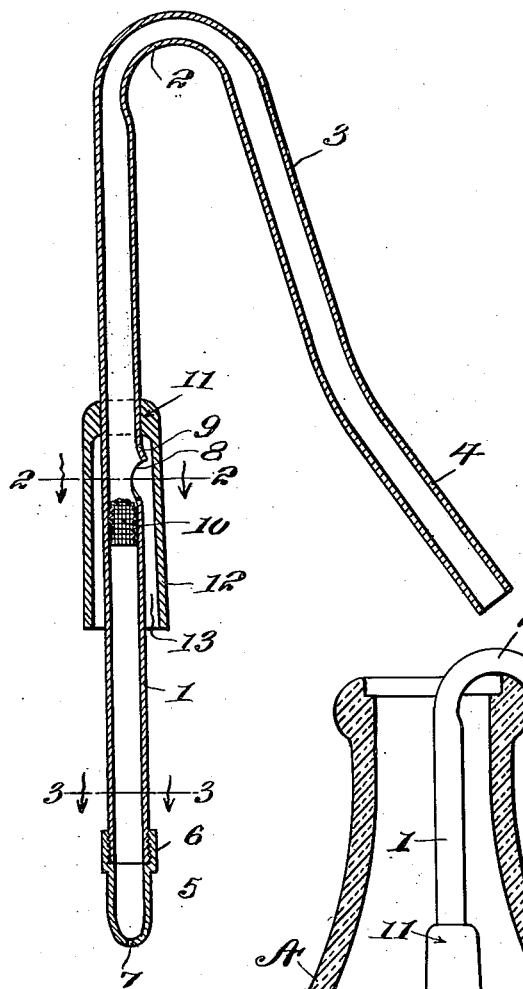
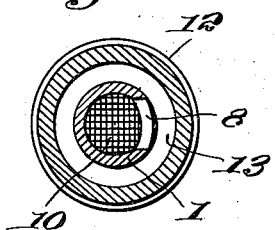
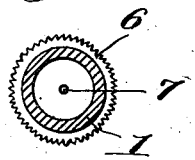
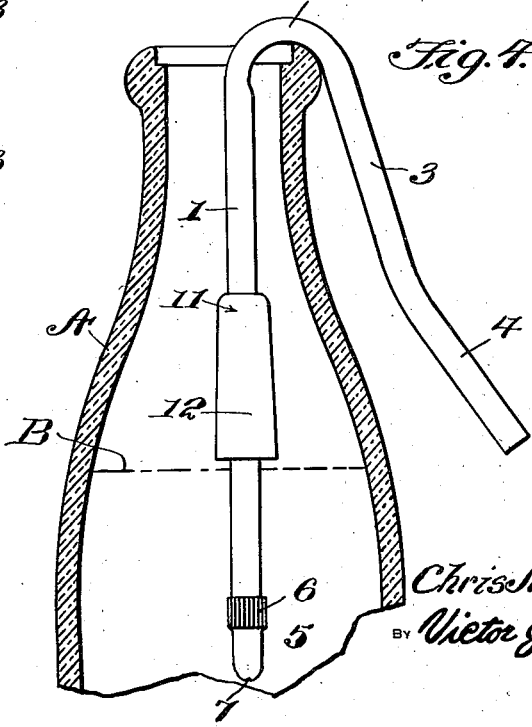
Chris A. Iverson INVENTOR
BY Victor J. Evans & Co.
ATTORNEYS Patented Sept. 16, 1941

2,256,432

UNITED STATES PATENT OFFICE 2,256,432

SIPHONING DEVICE

Chris A. Iverson, Bemidji, Minn.

Application April 24, 1940, Serial No. 331,459

1 Claim. (Cl. 137—20)

This invention relates to siphoning devices, and its general object is to provide a device that is primarily designed for removing cream from a bottle of milk in a manner whereby any portion of or all the cream can be removed, without commingling the milk therewith, with the result it will be seen that the cream is removed in an undiluted condition.

A further object is to provide a siphoning device that is self-starting in its action and does not include any valves, floats or other parts to become stuck or get out of order, and is constructed so that it can be readily cleaned and retained in a sanitary condition.

An important object is to provide a siphoning device that can be readily adjusted to vary the quantity of liquid removed from a container and the device is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a longitudinal sectional view taken through the device which forms the subject matter of the present invention.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 illustrates my device in use for removing cream from a bottle of milk.

While I have illustrated my device in use, for removing cream from a bottle A of milk, and the bottle is of the usual type, it will be obvious that the device can be used for removing liquid of any kind from a container of any type.

The device in the form shown consists of a single tube bent intermediate its ends in gooseneck formation to provide a long straight vertical portion 1, a curved portion 2, and a short portion 3 extending downwardly from the curved portion and outwardly inclined with respect to the straight portion, as well as includes an outwardly flared lower portion 4 providing what may be termed a pouring spout that has its lower end terminating a considerable distance above the lower end of the straight portion 1 which is to be placed within the bottle and is of ample length to extend far below the usual cream line B, as clearly shown in Figure 4.

The tube is preferably flattened on the underside of the curved portion 2, to provide a seat to rest upon the lip of the bottle without undue lateral or swinging movement of the device when placed within the bottle and when so placed, the straight portion extends substantially along the longitudinal center of the bottle so as to not engage the inner surface thereof, as shown.

Both ends of the tube are open and the lower end of the straight portion 1 is exteriorly threaded for receiving an elongated cap 5 provided with a serrated collar portion 6 to facilitate applying and removing the cap with respect to the straight portion. While the cap is shown as being threaded on the straight portion, it can be frictionally or otherwise secured thereto, but in any event an opening 7 is provided in the lower end of the cap, as clearly shown in Figure 3.

Disposed on the inner side of the straight portion and substantially midway the ends thereof is an inlet opening 8 having the upper edge portion thereof outwardly flared to provide a stop 9 for a purpose which will be presently described, and mounted in the straight portion for disposal just below the inlet opening 8 is a basket type screen 10 which tends to prevent cream that enters the opening 8 from passing down the straight portion, but allows for the free passage of air, as will be apparent.

Frictionally mounted for slidable movement on the straight portion 1 above the inlet opening 8 is an inverted elongated cup member 11 that includes a thickened upper portion having an opening therein for receiving the straight portion therethrough, for frictional engagement of the restricted portion for holding the member 11 at various adjusted positions above the inlet opening 8, as the stop 9 prevents movement of the member 11 below said opening, as will be apparent upon inspection of Figure 1. The skirt 12 of the cup member 11 is slightly outwardly flared from the restricted upper portion thereof and the skirt throughout its length is spaced in surrounding relation from the straight portion 1 to provide an annular chamber 13. The use of the cup member 11 together with the adjustability thereof makes it possible to vary the amount of cream removed from the bottle as the amount can be predetermined merely by moving the cup member 11 at the desired position on the straight portion 1, it being obvious that the quantity of cream removed increases when the cup member is adjusted downwardly and decreases when it is raised.

From the above description and the disclosure in the drawing, it is believed that the operation of my device will be obvious, but it might be mentioned that when it is desired to remove cream from a bottle of milk, the device is gently dropped into the bottle, for the curved portion 2 to rest upon the lip thereof, as shown in Figure 4. Air will be trapped between the cap 5 and the inlet opening 8 and is gradually displaced by the milk entering the opening 7, the milk forcing the air upwardly which in turn forces cream that has entered the opening 8 up and about the curved portion 2 to flow down the inclined or delivery portion 3 and through the outlet spout 4, thus starting the siphoning action to remove additional cream in accordance with the adjustment of the cup member.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A siphoning device comprising a tube bent in gooseneck formation to provide a long straight vertical portion having an inlet opening substantially midway its ends, a curved portion at the upper end of the long portion and a short portion downwardly and outwardly inclined from the curved portion, the short portion having its lower portion outwardly flared to provide a pouring spout, said tube having open ends, an elongated cap having an opening in its lower end and including a serrated collar threaded on the lower end of the long portion, a screen in the long portion below said inlet opening, a relatively narrow elongated inverted cup member slidably mounted on the long portion for adjustment with respect to said inlet opening to vary the quantity of liquid siphoned by the device, said cup member including an outwardly flared skirt surrounding and spaced from the long portion to provide a liquid receiving chamber, and said inlet opening having the upper portion of its edge outwardly flared to provide a stop to limit downward movement of the cup member.

CHRIS A. IVERSON.